(12) United States Patent
Yoon

(10) Patent No.: US 10,365,420 B2
(45) Date of Patent: Jul. 30, 2019

(54) METHOD FOR MANUFACTURING POLARIZING FILM USING ULTRASONIC VIBRATOR FOR ATOMIZING COATING SOLUTION

(71) Applicant: LG CHEM, LTD., Seoul (KR)

(72) Inventor: Seokhyun Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 14/897,620

(22) PCT Filed: Jul. 31, 2014

(86) PCT No.: PCT/KR2014/007041
§ 371 (c)(1),
(2) Date: Dec. 10, 2015

(87) PCT Pub. No.: WO2015/016631
PCT Pub. Date: Feb. 5, 2015

(65) Prior Publication Data
US 2016/0139312 A1    May 19, 2016

(30) Foreign Application Priority Data

Aug. 1, 2013 (KR) .................. 10-2013-0091746

(51) Int. Cl.
*G02B 1/14* (2015.01)
*G02B 5/30* (2006.01)
(Continued)

(52) U.S. Cl.
CPC .............. *G02B 5/305* (2013.01); *B05B 17/06* (2013.01); *B05D 1/02* (2013.01); *C23C 4/12* (2013.01);
(Continued)

(58) Field of Classification Search
CPC ........ B05B 17/06–17/0692; B05D 1/02; C08J 5/18; C23C 4/12; C23C 18/1287; G02B 1/14; G02B 5/30–5/305; G02F 1/133528
(Continued)

(56) References Cited

U.S. PATENT DOCUMENTS 4,046,074 A * 9/1977 Hochberg ................ B41J 2/215
205/53
4,544,343 A * 10/1985 Hide ........................ B29C 41/24
264/83
(Continued)

FOREIGN PATENT DOCUMENTS

CN    101501538 A    8/2009
JP    05-503395 A    6/1993
(Continued)

OTHER PUBLICATIONS

International search report for PCT/KR2014/007041 filed on Jul. 31, 2014.

*Primary Examiner* — Stephone B Allen
*Assistant Examiner* — Ryan S Dunning

(57) ABSTRACT

Disclosed herein are a polarizing film manufacturing method including (a) injecting a coating solution containing a component functioning as a polarizer into a sealed chamber to form an injection condition of the coating solution, (b) supplying a polyvinyl alcohol film into the chamber and dyeing outer surfaces of the polyvinyl alcohol film with the coating solution, and (c) discharging the polyvinyl alcohol film dyed with the coating solution out of the chamber, a polarizing film manufacturing apparatus, and a polarizing film exhibiting improved optical properties manufactured using the same.

14 Claims, 2 Drawing Sheets

(51) Int. Cl.
*B05B 17/06* (2006.01)
*C23C 4/12* (2016.01)
*B05D 1/02* (2006.01)
*C23C 18/12* (2006.01)

(52) U.S. Cl.
CPC ............ *C23C 18/1287* (2013.01); *G02B 1/14* (2015.01); *G02B 5/3025* (2013.01)

(58) Field of Classification Search
USPC ................ 118/300, 303, 323, 627, 629–634, 118/723 DC; 239/4; 349/96, 117, 138, 349/187, 194; 359/487.01, 487.02; 427/110, 163.1, 168, 421.1, 424, 427/427–427.3, 475, 512, 561, 565, 600
See application file for complete search history.

(56) References Cited

U.S. PATENT DOCUMENTS

| | | | |
|---|---|---|---|
| 5,110,618 A | | 5/1992 | Faust |
| 5,328,728 A | * | 7/1994 | Swirbel ............... G02F 1/13392 29/592.1 |
| 6,005,764 A | * | 12/1999 | Anderson ............. H01G 9/155 361/500 |
| 2002/0084447 A1 | * | 7/2002 | Taguchi ............... G02B 5/3025 252/582 |
| 2003/0091734 A1 | * | 5/2003 | Overton ................. C03C 25/62 427/163.2 |
| 2005/0100667 A1 | * | 5/2005 | Mayer ................... C03C 17/002 427/248.1 |
| 2008/0007829 A1 | * | 1/2008 | Mizushima ...... B29D 11/00634 359/487.02 |
| 2008/0213460 A1 | * | 9/2008 | Benter ................. A61L 31/048 427/2.1 |
| 2009/0273744 A1 | | 11/2009 | Wang et al. |
| 2010/0321613 A1 | * | 12/2010 | Hatsuda ............... B29C 55/026 349/96 |
| 2016/0139312 A1 | * | 5/2016 | Yoon ..................... G02B 5/305 359/487.02 |

FOREIGN PATENT DOCUMENTS

| | | |
|---|---|---|
| JP | 1999-344618 A | 12/1999 |
| JP | 2002-90547 A | 3/2002 |
| JP | 2003-185834 A | 7/2003 |
| JP | 2009-31627 A | 2/2009 |
| JP | 2009-031627 A | 2/2009 |
| JP | 2009-063982 A | 3/2009 |
| JP | 2012-053440 A | 3/2012 |
| JP | 2012-200637 A | 10/2012 |
| JP | 2013109287 A | 6/2013 |
| KR | 2003-0093991 A | 12/2003 |
| KR | 10-2010-0084846 A | 7/2010 |
| KR | 10-2013-0035193 A | 4/2013 |

* cited by examiner

【FIG. 1】
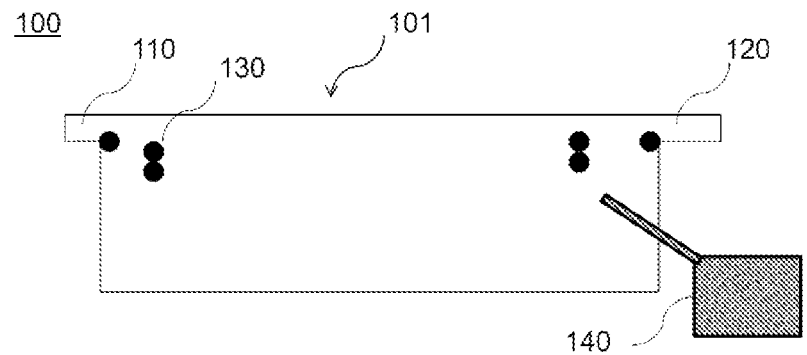
【FIG. 2】
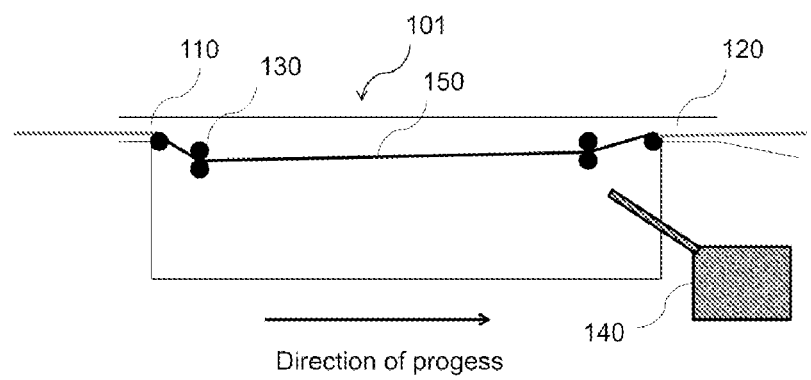
【FIG. 3】
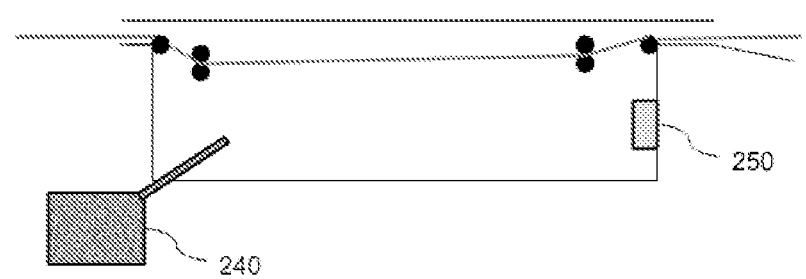

【FIG. 4】
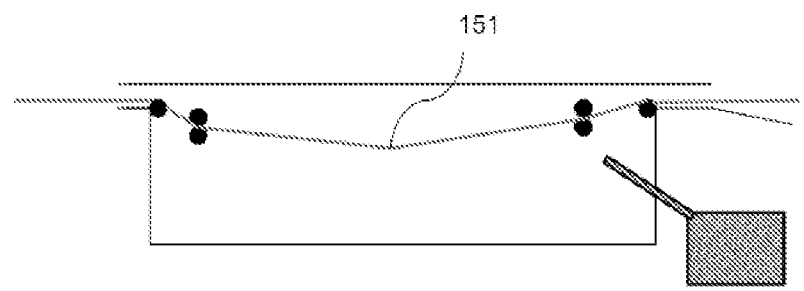

METHOD FOR MANUFACTURING POLARIZING FILM USING ULTRASONIC VIBRATOR FOR ATOMIZING COATING SOLUTION

CROSS REFERENCE TO RELATED APPLICATIONS

The present application is a U.S. National Stage of International Patent Application No. PCT/KR2014/007041 filed Jul. 31, 2014, which claims priority to Korean application number KR 10-2013-0091746, filed on Aug. 1, 2013, which are incorporated by reference in their entirety.

TECHNICAL FIELD

The present invention relates to a method and apparatus for manufacturing a polarizing film and a polarizing film manufactured using the same.

BACKGROUND ART

In general, a polarizing sheet or a polarizing film has a function of converting natural light into polarized light. Such a polarizing function is realized by a material dyed to a polarizing sheet.

For a liquid crystal display, an iodine type polarizing film dyed with iodine as a polarizing material is generally used. The iodine type polarizing film is manufactured by dyeing a polyvinyl alcohol film with dichromatic iodine or a dichromatic dye and orienting the polyvinyl alcohol film in a predetermined direction using a uniaxial elongating method. The iodine type polarizing film is usually used for LCDs.

The iodine type polarizing film may be manufactured, for example, through a wet type dyeing process of uniaxially elongating a non-elongated polyvinyl alcohol film in an aqueous solution and then dipping the polyvinyl alcohol film in a solution containing iodine or potassium iodide, dipping a non-elongated polyvinyl alcohol film in a solution containing iodine or potassium iodide and then uniaxially elongating the polyvinyl alcohol film, uniaxially elongating a non-elongated polyvinyl alcohol film in a solution containing iodine or potassium iodide, or uniaxially elongating a non-elongated polyvinyl alcohol film in a dry state and then dipping the polyvinyl alcohol film in a solution containing iodine or potassium iodide, or a dry type dyeing process of exposing a polyvinyl alcohol film to iodine steam.

Consequently, there is a high necessity for research into the manufacture of a polarizing film exhibiting improved optical properties through improvement of the dyeing process.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, when a polyvinyl alcohol film is dyed in a chamber having a predetermined injection condition to manufacture a polarizing film, the loss of optical properties and surface defects are minimized, thereby achieving a desired effect. The present invention has been completed based on these findings.

Technical Solution

In accordance with one aspect of the present invention, the above and other objects can be accomplished by the provision of a polarizing film manufacturing method including (a) injecting a coating solution containing a component functioning as a polarizer into a sealed chamber to form an injection condition of the coating solution, (b) supplying a polyvinyl alcohol film into the chamber and dyeing outer surfaces of the polyvinyl alcohol film with the coating solution, and (c) discharging the polyvinyl alcohol film dyed with the coating solution out of the chamber.

When a polarizing film is manufactured using a conventional dry type dyeing process, which exposes a polyvinyl alcohol film to iodine steam, the polyvinyl alcohol film may be non-uniformly dyed. In addition, a wet type dyeing process, which dips a polyvinyl alcohol film in a chamber containing iodine or potassium iodide dissolved in water and dyes the polyvinyl alcohol film with poly-iodide ions functioning as a polarizer, has an advantage in that the polyvinyl alcohol film is more uniformly dyed than in the dry type dyeing process. However, the surface of the polyvinyl alcohol film may easily wrinkle during a dyeing process since the polyvinyl alcohol film easily swells in water. In addition, the polyvinyl alcohol film may be excessively dyed, or may be non-uniformly dyed in regions, since a dyeing speed of iodine is high.

Conventionally, much process improvement has been made to dye a proper amount of iodine and to minimize wrinkles during a dyeing and swelling process. Basically, in a case in which the dyeing process is carried out in a state in which the polyvinyl alcohol film swells in the chamber, however, the polyvinyl alcohol film may be excessively dyed with iodine and may wrinkle due to swelling of the polyvinyl alcohol film.

The present invention solves the above problems through a process of dyeing a polyvinyl alcohol film in a chamber having a predetermined injection condition.

Specifically, the coating solution containing the component functioning as the polarizer may be an aqueous solution containing iodine.

The coating solution may be injected into the chamber using any one selected from among a spray nozzle injection method, an ultrasonic injection method, and an ultrasonic spray injection method.

First, the spray nozzle injection method is a method of injecting a coating solution through a micro nozzle in a mist state using the expansion force of an external gas.

Second, the ultrasonic injection method is a method of vibrating a coating solution using an ultrasonic vibrator to atomize the coating solution and conveying the atomized coating solution using a carrier gas to inject the atomized coating solution, as in an ultrasonic humidifier.

Finally, the ultrasonic spray injection method is a method of coupling an ultrasonic vibrator to a spray nozzle. Specifically, the ultrasonic spray injection method is a method of locating the ultrasonic vibrator at the front end of the nozzle, atomizing a coating solution flowing around the ultrasonic vibrator through ultrasonic vibration, and discharging the atomized coating solution through the micro nozzle in a state of being contained in a carrier gas. In the ultrasonic spray injection method, the size of the nozzle may be adjusted to perform ultrasonic injection while adjusting the amount of the coating solution. For this reason, the ultrasonic spray injection method may be preferably applied to the present invention.

The ultrasonic injection method and the ultrasonic spray injection method may inject the coating solution while applying an ultrasonic wave of 10 Hz to 100 Hz to the coating solution. Particularly in the ultrasonic spray injection method, an ultrasonic wave of 10 Hz to 60 Hz, more specifically 10 Hz to 50 Hz, may be used. If the magnitude of the ultrasonic wave is too small or large, an effect of ultrasonic application is lowered, which is not desirable.

The coating solution injected into the sealed chamber may have a concentration of $10^{-5}$ mole/liter to $10^{-1}$ mole/liter, more specifically $10^{-4}$ mole/liter to $10^{-2}$ mole/liter. The injected concentration is a condition for dyeing the surface of the polyvinyl alcohol film with a proper amount of the coating solution. If the concentration of the coating solution injected into the chamber is less than the above-defined value, the dyeing process may not be properly carried out, which is not desirable. On the other hand, if the concentration of the coating solution injected into the chamber is greater than the above-defined value, the surface of the polyvinyl alcohol film may be dyed with an excessive amount of the coating solution with the result that optical properties may be deteriorated, which is not desirable.

The injected concentration of the coating solution may be properly adjusted based on the number and injection speed of coating solution injectors, the size of a nozzle, and/or the magnitude of an ultrasonic wave that is applied.

Meanwhile, the outer surface of the polyvinyl alcohol film may be dyed with the coating solution in the chamber having the predetermined injection condition of the coating solution while the polyvinyl alcohol film is moved in the chamber and out of the chamber by rotary rolls.

The number and position of the rotary rolls, which move the polyvinyl alcohol film in the chamber and out of the chamber, in the chamber are not particularly restricted. For example, two or more of the rotary rolls may simultaneously contact the upper surface and the lower surface of the polyvinyl alcohol film.

The polyvinyl alcohol film may be dyed with the coating solution while being moved in the chamber by the rotary rolls at a speed of 0.5 m/min to 40 m/min, preferably 1 m/min to 20 m/min. If the moving speed of the polyvinyl alcohol film is too slow, the polyvinyl alcohol film may be non-uniformly dyed with an excessive amount of the coating solution, which is not desirable. On the other hand, if the moving speed of the polyvinyl alcohol film is too fast, the polyvinyl alcohol film may not be dyed with a sufficient amount of the coating solution, which is not desirable.

The polyvinyl alcohol film may be moved in the chamber along various routes based on the position of the rotary rolls. For example, the polyvinyl alcohol film may be moved in the chamber along one or more selected from a group consisting of a linear movement route, a V-shaped movement route, and a U-shaped movement route. In addition, the film may be moved along a vertical movement route in order to prevent a mist-phase dyeing solution from condensing on an inner wall of the chamber and falling onto the upper surface of the film.

The coating solution may be injected in a direction identical to or opposite to an advancing direction of the polyvinyl alcohol film.

The polarizing film manufacturing method may further include elongating the polyvinyl alcohol film dyed with the coating solution. The elongating process may include elongating the polyvinyl alcohol film at a elongating ratio of 1.5 to 6.

In accordance with another aspect of the present invention, there is provided a polarizing film manufacturing apparatus including (a) an inlet port and an outlet port, through which a polyvinyl alcohol film is moved, (b) two or more rotary rolls for moving the polyvinyl alcohol film in a state of contacting one surface of the polyvinyl alcohol film, and (c) a coating solution injector for dyeing the polyvinyl alcohol film with a coating solution.

For example, the coating solution injector may include an ultrasonic vibrator. The polarizing film manufacturing apparatus may further include a blower for circulating the injected coating solution in a chamber.

In accordance with another aspect of the present invention, there is provided a polarizing film manufactured using the polarizing film manufacturing method as described above. The polarizing film is more uniformly dyed with a component functioning as a polarizer than the polarizing film manufactured through the conventional wet type dyeing process or dry type dyeing process. For example, the polarizing film may have a degree of polarization of 99.95% or higher, specifically 99.97% or higher, more specifically 99.99% or higher.

The above-mentioned value is higher than that of the polarizing film manufactured through the conventional wet type dyeing process or dry type dyeing process.

In accordance with a further aspect of the present invention, there is provided a polarizing sheet manufactured by attaching protective films to an upper surface and a lower surface of the polarizing film having the above-stated construction.

The protective films protect the surfaces of the polarizing film from foreign matter during various assembly processes. The protective films may be attached to the polarizing film using a polyvinyl ethylene (PVE) adhesive. A triacetyl cellulose film and a cycloolefin copolymer film may be used as each of the protective films. Specifically, a triacetyl cellulose film may be used as each of the protective films.

The triacetyl cellulose film and the cycloolefin copolymer film are hydrophobic protective films, which may be dipped into an alkaline solution (e.g. a KOH or NaOH solution) such that an —OH group is introduced into the surfaces of the film to modify the surfaces of the film so as to exhibit a hydrophilic property, thereby improving adhesion between the surfaces of the film and a hydrophilic adhesive.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a polarizing film manufacturing apparatus according to an embodiment of the present invention;

FIG. 2 is a typical plan view showing a method of manufacturing a polarizing film using the polarizing film manufacturing apparatus of FIG. 1;

FIG. 3 is a typical plan view showing a method of manufacturing a polarizing film according to another embodiment of the present invention; and FIG. 4 is a typical plan view showing a method of manufacturing a polarizing film according to a further embodiment of the present invention.

BEST MODE

Now, exemplary embodiments of the present invention will be described in detail with reference to the accompanying drawings. It should be noted, however, that the scope of the present invention is not limited by the illustrated embodiments.

For the convenience of understanding, only some components of a polarizing film manufacturing apparatus are shown in the drawings, and other components of the polarizing film manufacturing apparatus are omitted from the drawings.

FIG. 1 is a typical plan view showing a polarizing film manufacturing apparatus according to the present invention.

Referring to FIG. 1, a polarizing film manufacturing apparatus 100 according to the present invention includes an inlet port 110, through which a polyvinyl alcohol film is introduced, an outlet port 120, through which the polyvinyl alcohol film is discharged, rotary rolls 130 for moving the polyvinyl alcohol film in a state of contacting one surface of the polyvinyl alcohol film, and an ultrasonic vibrator 140 for injecting an iodine aqueous solution.

Specifically, an aqueous solution containing iodine functioning as a polarizer may be injected into a chamber 101 using the ultrasonic vibrator 140. In this case, the inlet port 110 and the outlet port 120 of the chamber 101 may be in a closed state, and the magnitude of an ultrasonic wave and an injection speed of the a coating solution injected into the sealed chamber may be properly adjusted such that the coating solution in the sealed chamber has a concentration of $10^{-5}$ mole/liter to $10^{-1}$ mole/liter. For example, an ultrasonic wave of 10 Hz to 100 Hz may be applied to inject an aqueous solution containing iodine into the chamber 101.

The number and position of the rotary rolls 130 in the chamber 101 are not particularly restricted, and the rotary rolls 130 may be located at proper positions in the chamber 101 in order to move the polyvinyl alcohol film.

FIG. 2 is a typical plan view showing a method of manufacturing a polarizing film using the polarizing film manufacturing apparatus of FIG. 1.

Referring to FIG. 2, during the movement of a polyvinyl alcohol film 150 through the inlet port 110 and the outlet port 120 of the chamber 101, surfaces of the polyvinyl alcohol film 150 may be dyed according to an injection condition of an aqueous solution containing iodine formed in the chamber 101.

The rotary rolls 130 may be located at proper positions in the chamber 101 in order to properly move the polyvinyl alcohol film 150 in a direction indicated by an arrow, and the number and position of the rotary rolls 130 in the chamber 101 are not particularly restricted. For example, two or more of the rotary rolls may simultaneously contact the upper surface and the lower surface of the polyvinyl alcohol film 150.

The moving speed of the polyvinyl alcohol film 150 and the injection speed of iodine injected by the ultrasonic vibrator 140 may be properly adjusted to properly adjust the amount of iodine dyed to the surfaces of the polyvinyl alcohol film 150.

As compared with a dry type process and a wet type process, a proper amount of iodine may be uniformly dyed to the surfaces of the polyvinyl alcohol film 150, whereby it is possible to manufacture a polarizing sheet exhibiting high optical properties.

FIG. 3 is a typical plan view showing a method of manufacturing a polarizing film according to another embodiment of the present invention.

A polarizing film manufacturing apparatus 200 shown in FIG. 3 includes an ultrasonic vibrator 240 for injecting an iodine aqueous solution and a blower 250.

The ultrasonic vibrator 240 may inject the iodine aqueous solution in a direction identical to or opposite to an advancing direction of a polyvinyl alcohol film. The blower 250 may be located so as to effectively disperse the iodine aqueous solution injected by the polarizing film manufacturing apparatus. The position and number of the blower 250 and the ultrasonic vibrator 240 are not particularly restricted.

FIG. 4 is a typical plan view showing a method of manufacturing a polarizing film according to a further embodiment of the present invention.

Referring to FIG. 4, a polyvinyl alcohol film 151 may move in the chamber along a mixed route consisting of a linear movement route and a V-shaped movement route. The movement route is not particularly restricted so long as the polyvinyl alcohol film 15 is effectively dyed.

INDUSTRIAL APPLICABILITY

As is apparent from the above description, a polarizing film manufacturing method according to the present invention includes a process of dyeing iodine using an ultrasonic spray process, whereby it is possible to greatly reduce the amount of an iodine aqueous solution that is used as compared with a conventional process. In addition, the surfaces of a polyvinyl alcohol member may be uniformly dyed with the minimum amount of iodine that is capable of exhibiting polarizing properties, whereby it is possible to minimize surface defects, such as wrinkles, and thus to improve optical properties of a polarizing film that is manufactured.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polarizing film manufacturing method comprising:
    (a) injecting a coating solution into a sealed chamber by atomizing the coating solution using an ultrasonic vibrator and carrying the atomized coating solution into the chamber using a carrier gas, the coating solution including a component functioning as a polarizer, wherein process (a) comprises injecting the coating solution using an ultrasonic injection method or an ultrasonic spray injection method;
    (b) supplying a polyvinyl alcohol film into the chamber and dyeing outer surfaces of the polyvinyl alcohol film with the atomized coating solution in the chamber; and
    (c) discharging the polyvinyl alcohol film dyed with the coating solution out of the chamber,
    wherein the coating solution is injected while an ultrasonic wave of 10 Hz to 100 Hz is applied to the coating solution.

2. The polarizing film manufacturing method according to claim 1, wherein the coating solution containing the component functioning as the polarizer is an aqueous solution containing iodine.

3. The polarizing film manufacturing method according to claim 1, wherein the coating solution injected into the chamber has a concentration of $10^{-5}$ mole/liter to $10^{-1}$ mole/liter.

4. The polarizing film manufacturing method according to claim 1, wherein the polyvinyl alcohol film is moved in the chamber and out of the chamber by rotary rolls.

5. The polarizing film manufacturing method according to claim 4, wherein two or more of the rotary rolls simultaneously contact an upper surface and a lower surface of the polyvinyl alcohol film.

6. The polarizing film manufacturing method according to claim 1, wherein the polyvinyl alcohol film is dyed with the coating solution while being moved in the chamber at a speed of 0.5 m/min to 40 m/min.

7. The polarizing film manufacturing method according to claim 1, wherein the polyvinyl alcohol film is moved in the chamber along one or more selected from a group consisting of a linear movement route, a V-shaped movement route, and a U-shaped movement route.

8. The polarizing film manufacturing method according to claim 1, wherein the coating solution is injected in a direction identical to or opposite to an advancing direction of the polyvinyl alcohol film.

9. The polarizing film manufacturing method according to claim 1, further comprising elongating the polyvinyl alcohol film dyed with the coating solution.

10. The polarizing film manufacturing method according to claim 9, wherein the elongating process comprises elongating the polyvinyl alcohol film at a elongating ratio of 1.5 to 6.

11. A polarizing film manufactured using a polarizing film manufacturing method according to claim 1.

12. The polarizing film according to claim 11, wherein the polarizing film has a degree of polarization of 99.95% or higher.

13. A polarizing sheet manufactured by attaching protective films to an upper surface and a lower surface of a polarizing film according to claim 11.

14. The polarizing sheet according to claim 13, wherein each of the protective films is a triacetyl cellulose film.

* * * * *